(12) United States Patent
Nimmagadda et al.

(10) Patent No.: US 12,033,661 B2
(45) Date of Patent: Jul. 9, 2024

(54) VEHICLE INFOTAINMENT SYSTEM FOR SELECTING RECORDINGS BASED ON USER EMOTION

(71) Applicant: GM Global Technology Operations LLC, Detroit, MI (US)

(72) Inventors: Vikramaditya Nimmagadda, Wixom, MI (US); Arun Adiththan, Sterling Heights, MI (US); Aravind Gangumalla, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 254 days.

(21) Appl. No.: 17/747,186

(22) Filed: May 18, 2022

(65) Prior Publication Data
US 2023/0377601 A1   Nov. 23, 2023

(51) Int. Cl.
| | |
|---|---|
| *G10L 25/63* | (2013.01) |
| *B60R 16/037* | (2006.01) |
| *G06F 3/16* | (2006.01) |
| *G06F 40/166* | (2020.01) |
| *G06F 40/205* | (2020.01) |
| *G06F 40/279* | (2020.01) |
| *G06N 3/08* | (2023.01) |
| *G10L 15/04* | (2013.01) |

(Continued)

(52) U.S. Cl.
CPC ............ *G10L 25/63* (2013.01); *B60R 16/037* (2013.01); *G06F 3/165* (2013.01); *G06F 40/166* (2020.01); *G06F 40/205* (2020.01); *G06F 40/279* (2020.01); *G06N 3/08* (2013.01); *G10L 15/04* (2013.01); *G10L 15/16* (2013.01); *G10L 15/22* (2013.01)

(58) Field of Classification Search
CPC ...... B60K 35/10; B60K 35/29; B60R 16/037; B60W 10/30; G05D 1/0088; G06F 3/165; G06F 9/44505; G06F 16/433; G06F 40/166; G06F 40/205; G06F 40/279; G06F 40/30; G06N 3/0464; G06N 3/08; G06N 3/0895; G06N 7/01; G06N 20/00; G06Q 30/0256; G06Q 30/0631; G06V 20/597; G06V 40/175; G08G 1/09677; G10L 15/04; G10L 15/08; G10L 15/16; G10L 15/1815; G10L 15/22; G10L 17/04; G10L 25/54; G10L 25/63; G10L 2015/225; H04H 60/35; H04N 21/4421; H04W 4/40; H04W 4/48

See application file for complete search history.

(56) References Cited

U.S. PATENT DOCUMENTS 10,878,787 B2 * 12/2020 Hampiholi ............. B60K 35/10
10,943,604 B1 * 3/2021 Bone ........................ G10L 17/04
(Continued)

*Primary Examiner* — Gerald Gauthier
(74) *Attorney, Agent, or Firm* — Vivacqua Crane, PLLC

(57) ABSTRACT

An infotainment system for a vehicle selects and plays recordings based on a current emotion of a user in response to receiving a user-generated query. The user-generated query includes one or more words indicating a current state of mind of the user. The infotainment system includes one or more controllers in electronic communication with one or more recording databases that store a plurality of content clusters that each describe a specific recording. The one or more controllers execute instructions to select a recording described by a selected content cluster, where the recording reflects the current emotion of a user.

20 Claims, 3 Drawing Sheets

(51) Int. Cl.
*G10L 15/16* (2006.01)
*G10L 15/22* (2006.01)

(56) References Cited

U.S. PATENT DOCUMENTS

| | | | |
|---|---|---|---|
| 11,587,561 B2* | 2/2023 | Weir | G10L 15/1815 |
| 2008/0052080 A1* | 2/2008 | Narayanan | G06V 40/175 |
| | | | 704/E17.002 |
| 2013/0283303 A1* | 10/2013 | Moon | G06Q 30/0631 |
| | | | 725/10 |
| 2014/0172431 A1* | 6/2014 | Song | G06F 16/433 |
| | | | 704/275 |
| 2014/0309869 A1* | 10/2014 | Ricci | G08G 1/096775 |
| | | | 701/36 |
| 2015/0053066 A1* | 2/2015 | Hampiholi | B60K 35/10 |
| | | | 84/602 |
| 2015/0363164 A1* | 12/2015 | Caskey | G06F 3/165 |
| | | | 340/4.4 |
| 2017/0370741 A1* | 12/2017 | Swaminathan | H04W 4/40 |
| 2018/0189581 A1* | 7/2018 | Turcot | G06V 20/597 |
| 2018/0204570 A1* | 7/2018 | Puranik | H04N 21/44218 |
| 2018/0285752 A1* | 10/2018 | Yu | G06Q 30/0256 |
| 2019/0138327 A1* | 5/2019 | Huang | G06F 9/44505 |
| 2019/0171409 A1* | 6/2019 | Boulanger | H04H 60/35 |
| 2019/0283761 A1* | 9/2019 | Bielby | G05D 1/0088 |
| 2019/0324600 A1* | 10/2019 | Wipperfürth | H04W 4/48 |
| 2021/0064827 A1* | 3/2021 | Galitsky | G06N 20/00 |
| 2021/0279514 A1* | 9/2021 | Turcot | G06V 40/175 |
| 2021/0304787 A1* | 9/2021 | Verbeke | G06F 40/30 |
| 2022/0398411 A1* | 12/2022 | Cowen | G06N 3/0895 |
| 2022/0410932 A1* | 12/2022 | Braunstein | B60W 10/30 |
| 2023/0066797 A1* | 3/2023 | Ramanjani | G10L 15/08 |
| 2023/0186878 A1* | 6/2023 | Wipperfürth | G06F 3/165 |
| | | | 715/772 |
| 2023/0377601 A1* | 11/2023 | Nimmagadda | G10L 15/04 |
| 2023/0401025 A1* | 12/2023 | Liu | B60K 35/29 |

\* cited by examiner

VEHICLE INFOTAINMENT SYSTEM FOR SELECTING RECORDINGS BASED ON USER EMOTION

INTRODUCTION

The present disclosure relates to an infotainment system for a vehicle that selects and plays recordings based on a current emotion of a user in response to receiving a user-generated query.

Many vehicles commonly employ in-vehicle infotainment to provide audio and visual entertainment as well as other information onboard the vehicle. An infotainment system may include audio and visual systems that are controlled using buttons, knobs, touchscreens, or by handsfree voice control. A user may select a specific song or audio file based on categories such as, for example, an artist's name, a title of a song, genre, or mood. Some examples of music genre include, but are not limited to, blues, country, and rock.

In some instances, a user may manually select a song based on the emotions they are presently experiencing. For example, if a user is in an unhappy mood, he or she may select songs under the blues or country genres. Alternatively, the user may select a particularly unhappy or sad song by its title. Thus, it is to be appreciated that current infotainment systems provide users with a primitive experience where they are only able to select and retrieve music and other audio/visual recordings based on simple categories like genre, mood, or by artist name.

Thus, while current infotainment systems achieve their intended purpose, there is a need in the art for an improved infotainment system that provides a user with a more personalized audio and visual experience based on his or her current emotion.

SUMMARY

According to several aspects, an infotainment system for a vehicle including a plurality of vehicle interior sensors that collect sensor data indicating a current emotion of a user is disclosed. The infotainment system includes one or more controllers in electronic communication with one or more recording databases that store a plurality of content clusters that each describe a specific recording. The one or more controllers execute instructions to monitor the plurality of vehicle interior sensors. The one or more controllers execute instructions to receive a user-generated query including one or more words indicating a current state of mind of the user. In response to receiving the user-generated query, the one or more controllers execute instructions to determine one or more word vectors that numerically represent the current state of mind of the user. The one or more controllers execute instructions to determine, based on one or more machine learning techniques, one or more emotion vectors based on the sensor data collected by the plurality of vehicle interior sensors. The one or more controllers execute instructions to append the one or more word vectors and the one or more emotion vectors into a combined word and emotion vector. The one or more controllers execute instructions to compare the combined word and emotion vector with the plurality of content clusters stored in the one or more recording databases to determine a selected content cluster that is most similar to the combined word and emotion vector. The one or more controllers execute instructions to select a recording described by the selected content cluster, where the recording reflects the current emotion of a user.

In one aspect, the one or more machine learning techniques is a Gaussian mixture model (GMM).

In another aspect, the emotion vectors determined by the Gaussian mixture model is a combined emotional vector that is determined based on different sensor modalities available onboard the vehicle.

In yet another aspect, the one or more machine learning techniques is a combined Gaussian mixture model and Deep Neural Network (GMM-DNN).

In one aspect, the deep neural network is a convolutional neural network (CNN).

In another aspect, the recording is segmented into different sections based on emotional content.

In yet another aspect, the recording is one of the following: a musical song, a movie clip, a clip of a television show, a podcast, a training session, educational session, and personal recording.

In one aspect, the one or more controllers are in electronic communication with one or more sources of recorded content.

In another aspect, the one or more controllers determine the plurality of content clusters that each describe a specific recording by receiving the specific recording from the one or more sources of recorded content, parsing dialogue in the specific recording to determine a text summary of the dialogue, and determining one or more dialogue word vectors that numerically represent the text summary of the dialogue and one or more dialogue emotion vectors that represent emotions expressed in the text summary of the dialogue of the specific recording.

In still another aspect, the one or more controllers determine the plurality of content clusters that each describe a specific recording by appending the one or more dialogue word vectors that numerically represent the text summary of the dialogue in the specific recording and the one or more dialogue emotion vectors that numerically represent emotions expressed in the text summary of the dialogue together into a combined dialogue word and emotion vector.

In one aspect, the one or more controllers determine the plurality of content clusters that each describe a specific recording by executing a clustering algorithm to determine a centroid of the combined word and emotion vector representing the represent the text summary of the dialogue in the recording, wherein the centroid is the content cluster that describes the specific recording.

In another aspect, the one or more controllers are in electronic communication with a speaker and a display.

In yet another aspect, the one or more controllers execute instructions to determine a vehicle state, where the vehicle state indicates a gear position the vehicle.

In one aspect, in response to determining the vehicle state is Park, the one or more controllers determine audio content is played over the speaker and visual content is shown upon the display.

In another aspect, in response to determining the vehicle state is a gear position other than Park, the controllers only play audio content over the speaker.

In an aspect, a method for selecting and playing recordings based on a current emotion of a user by an infotainment system. The method includes monitoring, by one or more controllers, a plurality of vehicle interior sensors. The one or more controllers are in electronic communication with one or more recording databases that store a plurality of content clusters that each describe a specific recording. The method includes receiving a user-generated query including one or more words indicating a current state of mind of the user. In response to receiving the user-generated query, the method includes determining one or more word vectors that numerically represent the current state of mind of the user. The method includes determining, based on one or more machine learning techniques, one or more emotion vectors based on sensor data collected by the plurality of vehicle interior sensors. The method includes appending the one or more word vectors and the one or more emotion vectors into a combined word and emotion vector. The method includes comparing the combined word and emotion vector with the plurality of content clusters stored in the one or more recording databases to determine a selected content cluster that is most similar to the combined word and emotion vector. Finally, the method includes selecting a recording described by the selected content cluster, where the recording reflects the current emotion of a user.

In an aspect, an infotainment system for a vehicle includes a plurality of vehicle interior sensors that collect sensor data that indicate a current emotion of a user, where the user is located within an interior cabin of the vehicle. The infotainment system also includes one or more recording databases that store a plurality of content clusters that each describe a specific recording and one or more controllers in electronic communication with the plurality of vehicle interior sensors and the one or more recording databases. The one or more controllers execute instructions to monitor the plurality of vehicle interior sensors. The one or more controllers receive a user-generated query including one or more words indicating a current state of mind of the user. In response to receiving the user-generated query, the one or more controllers determine one or more word vectors that numerically represent the current state of mind of the user. The controller determines, based on one or more machine learning techniques, one or more emotion vectors based on the sensor data collected by the plurality of vehicle interior sensors. The controllers combine the one or more word vectors and the one or more emotion vectors into a combined word and emotion vector. The controllers compare the combined word and emotion vector with the plurality of content clusters stored in the one or more recording databases to determine a selected content cluster that is most similar to the combined word and emotion vector. Finally, the one or more controllers select a recording described by the selected content cluster, where the recording reflects the current emotion of a user.

In one aspect, the vehicle interior sensors include one or more of the following: one or more in-cabin cameras that are part of a driver monitoring system (DMS), biometric sensors, pressure sensors, and steering wheel torque sensors.

In another aspect, the one or more machine learning techniques is a GMM.

In still another aspect, the one or more machine learning techniques is a combined GMM-DNN.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
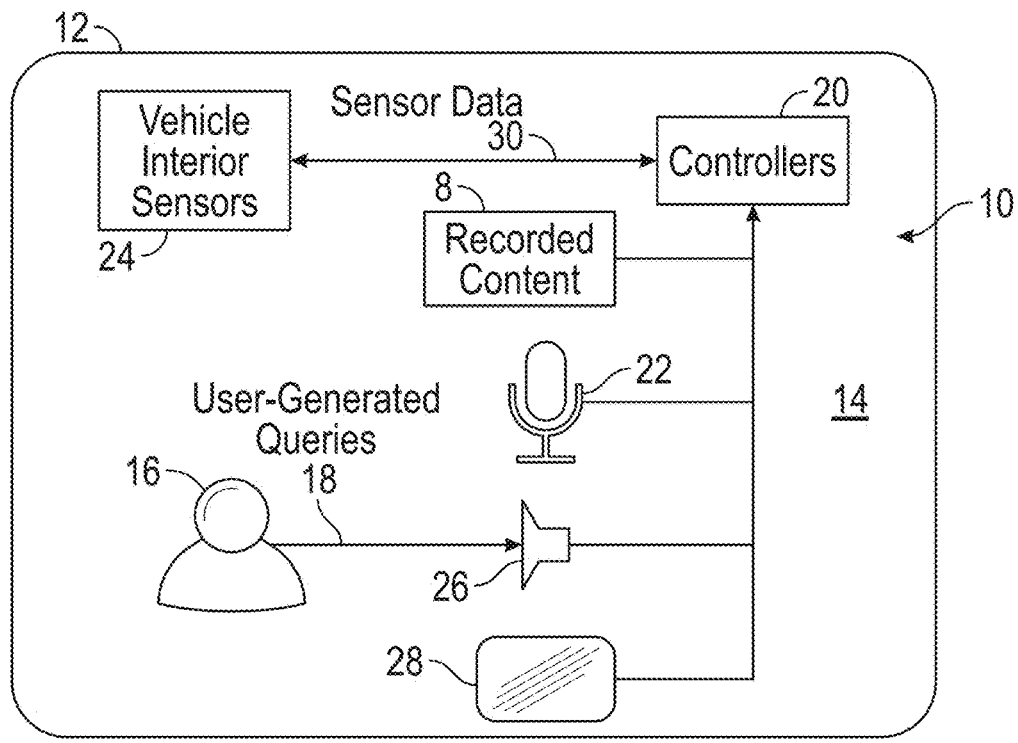
FIG. 1 is a schematic diagram of the disclosed infotainment system that includes one or more controllers in electronic communication with a plurality of vehicle interior sensors, according to an exemplary embodiment.

Referring to FIG. 1, an exemplary infotainment system 10 for a vehicle 12 that selects and plays recordings based on a current emotion of a user 16 is illustrated. The vehicle 12 may be any type of vehicle such as, but not limited to, a sedan, truck, sport utility vehicle, van, a ride-share vehicle, or motor home. The infotainment system 10 includes one or more controllers 20 in electronic communication with one or more sources of recorded content 8, a user input device 22, a plurality of vehicle interior sensors 24, a speaker 26, and a display 28. The plurality of vehicle interior sensors 24 collect sensor data 30 for determining the current emotion of the user 16, where the user 16 is located within an interior cabin 14 of the vehicle 12. It is to be appreciated that the user 16 is any occupant, such as a driver or passenger of the vehicle 12. The user input device 22 may be any device for receiving user-generated queries 18. In the example as shown, the user input device 22 is a microphone for receiving a voice query, however, it is to be appreciated that the user input device 22 may be a multi-modal input system. For example, in an embodiment, the user input device 22 may include a touchscreen or keypad.

As explained below, the infotainment system 10 selects and plays recordings based on a current emotion of the user 16 in response to receiving the user-generated query 18. The infotainment system 10 detects the current emotion of the user 16 based on the sensor data 30 collected by the plurality of vehicle interior sensors 24 and the user-generated query 18. The user-generated query 18 includes one or more words indicating a current state of mind of the user 16. For example, the user-generated query 18 may be a voice query where the user 16 states that "I feel doubtful about my dreams and am tense," or "I am very happy and feel great."

The recording may be an audio recording or a combined audio and visual recording. The recording includes one or more words that invoke the emotion of a user. The one or more sources of recorded content 8 include content sources such, for example, streaming content and vehicle playlists. The streaming content may include any type of media content that is streamed over the internet and played back in real time. In an embodiment, the recording is a song. However, it is to be appreciated that other types of audio and combined audio and visual recordings may be used as well such as, for example, a movie clip, a clip of a television show such as a sitcom, a podcast, a training or educational session such as foreign language lessons, or a personal recording created by the user. The personal recordings may include events recorded by the user 16 such as, for example, parties, holiday events, vacations, and concerts. It is to be appreciated that in some embodiments, the recording is segmented into different sections based on emotional content. For example, a song may have an introduction, several versus, and a chorus that each invoke different emotions in people.

The plurality of vehicle interior sensors 24 collect the sensor data 30 indicating the current emotion of the user 16 and include sensors such as, but not limited to, one or more in-cabin cameras that are part of a driver monitoring system (DMS), biometric sensors, pressure sensors in the steering wheel and the seats, steering wheel torque sensors, microphones, and wearable devices. One example of a wearable device is a smartwatch that monitors heartbeat. In one example, cameras may be mounted to a rear-view mirror, dash, or A-pillar of the vehicle 12 to monitor facial expressions of the user 16, which indicate emotion. In one example, an impulse-radio ultra-wideband (IR-UWB) radar system may be used to detect biometric features such as heartrate and breathing rate of the user 16.

Figure 2:
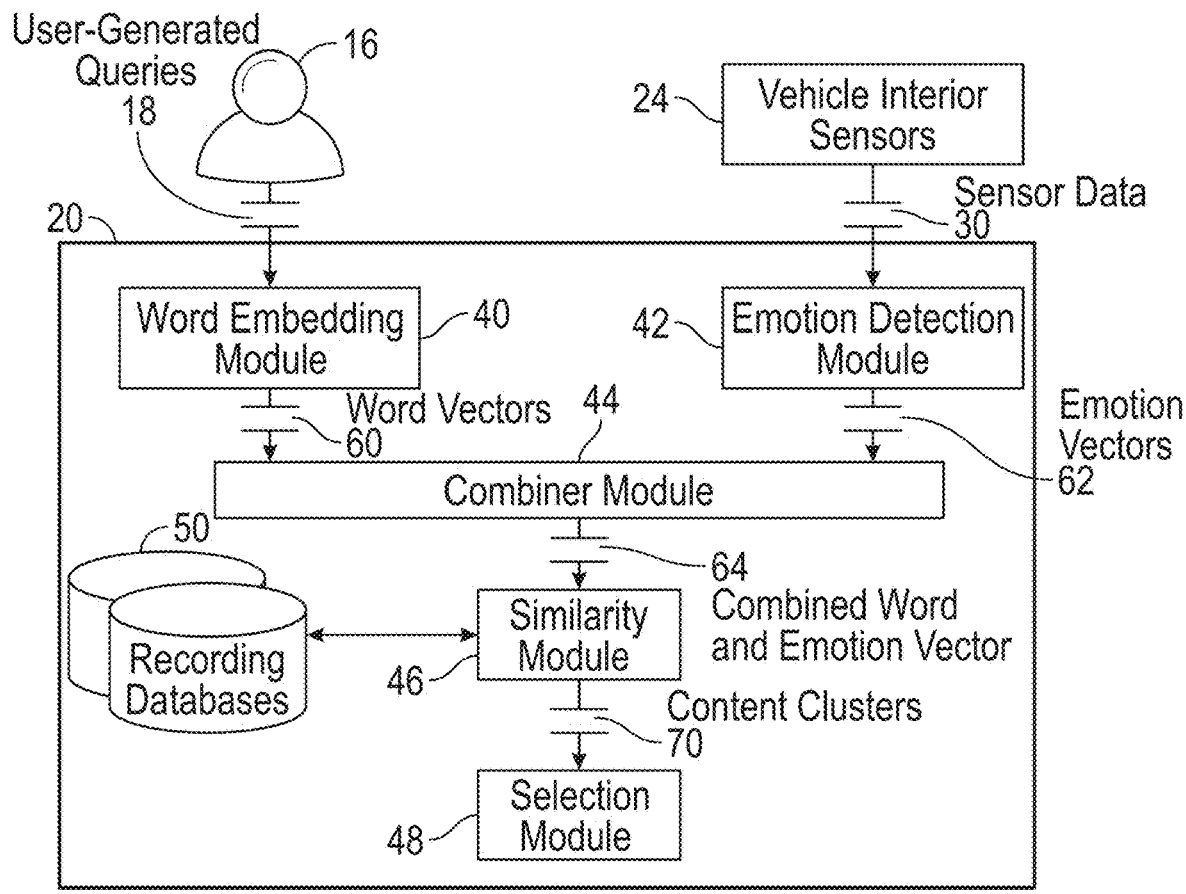
FIG. 2 is a block diagram of the controller shown in FIG. 1 in communication with one or more recording databases that store content clusters, according to an exemplary embodiment.

FIG. 2 is a block diagram of the one or more controllers 20 shown in FIG. 1. It is to be appreciated that although the one or more controllers 20 are illustrated as on-board the vehicle 12, other processing mechanisms such as edge-based processing or cloud processing may be used as well. The one or more controllers 20 include a word embedding module 40, an emotion detection model 42, a combiner module 44, a similarity module 46, and a selection module 48. The one or more controllers 20 are also in communication with one or more recording databases 50 that store a plurality of content clusters 70 that each describe a specific recording. As mentioned above, in embodiments a recording may be segmented into different sections based on emotional content. Thus, each segment of a recording may be associated with a unique content cluster 70. Although FIG. 2 illustrates the one or more recording databases 50 stored locally, it is to be appreciated that FIG. 2 is merely exemplary in nature and the one or more recording databases 50 may also be stored online (i.e., cloud-based storage).

Referring to both FIGS. 1 and 2, the word embedding module 40 receives the user-generated query 18 from the user 16 and determines one or more word vectors 60 that numerically represent the user-generated query 18. As mentioned above, the user-generated query 18 includes one or more words indicating the current state of mind of the user 16. The one or more word vectors 60 numerically represent the one or more words indicating the current state of mind of the user. The emotion detection model 42 receives the sensor data 30 collected from the plurality of vehicle interior sensors 24 as input and determines, based on one or more machine learning techniques, one or more emotion vectors 62 based on the sensor data 30. The one or more machine learning techniques are explained in greater detail below. The emotion vectors 62 numerically represent an emotional state exhibited by the user 16 while he or she is creating the user-generated query 18. As seen in FIG. 2, the combiner module 44 receives the word vector 60 and the emotional vector 62 and appends the word vector 60 and the emotional vector 62 together into a combined word and emotion vector 64.

Figure 3:
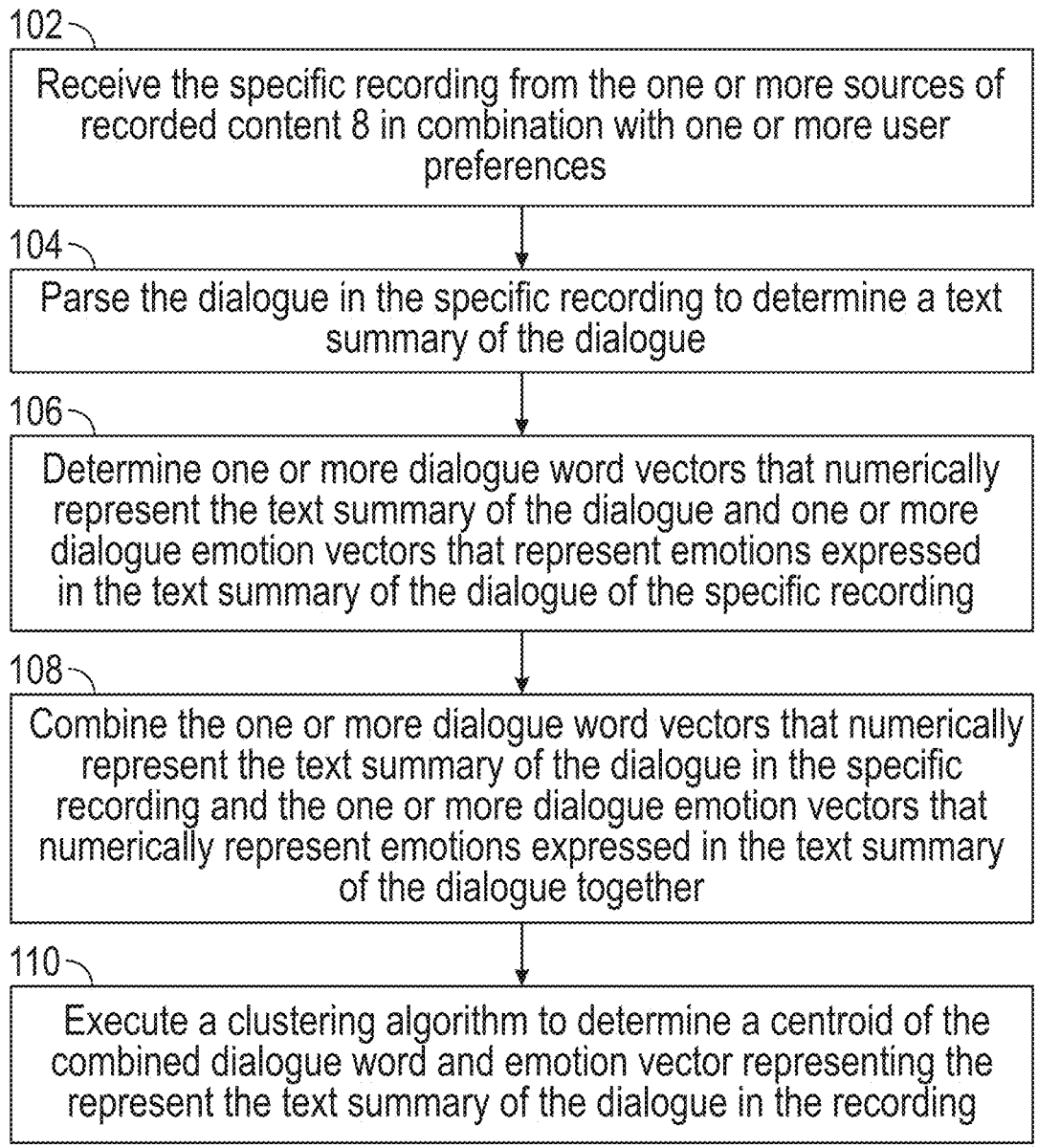
FIG. 3 is a process flow diagram illustrating a method for determining the content clusters stored by the recording databases shown in FIG. 2, according to an exemplary embodiment.

The similarity module 46 compares the combined word and emotion vector 64 with the content clusters 70 stored in the one or more recording databases 50 and selects the content cluster 70 that is most similar to the combined word and emotion vector 64. A method 100 for determining the content clusters 70 is shown in FIG. 3 and is described below. In embodiments, the content cluster 70 may describe a segment of a specific recording. In one non-limiting embodiment, the similarity module 46 selects the content cluster 70 most similar to the combined word and emotion vector 64 based on cosine similarity, however, it is to be appreciated that other measures of similarity between two sequences of numbers may be used as well.

The selection module 48 receives the content cluster 70 that is most similar to the combined word and emotion vector 64, and then selects the specific recording described by the content cluster 70. The infotainment system 10 then plays the recording over the speaker 26 (FIG. 1), where the speaker 26 may be a wired or wireless speaker. It is to be appreciated that the recording reflects the current emotion of a user. Thus, if the user 16 is unhappy and tense, then a recording described as unhappy and tense is selected to play over the speaker 26 to reflect the current emotion of the user 16. In an embodiment, the user 16 may provide feedback regarding the recording selected by the selection module 48.

In embodiments, the selection module 48 determines if only the audio content of the specific recording is played over the speaker 26 (seen in FIG. 1), or both the audio content and any visual content of the specific recording is shown upon the display 28 based on a vehicle state. The vehicle state indicates a gear position the vehicle 12 (FIG. 1), where the gear position indicates when the vehicle 12 is placed into the Park gear position. In response to determining the vehicle state is Park, the selection module 48 determines the audio content is played over the speaker 26 and the visual content, if any, of the specific recording is shown upon the display 28. However, in response to determining the vehicle state is another gear position other than Park, the selection module 48 only plays the audio content over the speaker 26.

The emotion detection model 42 shall now be described. As mentioned above, the emotion detection model 42 determines the emotion vectors 62 based on one or more machine learning techniques. In an embodiment, the one or more machine learning techniques is either a Gaussian mixture model (GMM) or, in the alternative, a combined Gaussian mixture model and Deep Neural Network (GMM-DNN). A Gaussian mixture model equation is expressed in Equation 1 below, where a unique Gaussian mixture model is trained for each emotional state of the user 16.

Equation 1 includes emotional classes K that each signify an emotional state of the user 16 (e.g., K={angry, happy, sad, neutral}) and classifiers C, which represent different sensor modalities. The different sensor modalities refer to the different vehicle interior sensors 24 (e.g., C={DMS camera, IR-UWB radar system, seat pressure sensor, steering wheel torque sensor}), where Equation 1 solves for a combined emotional vector that is determined based on the different classifiers or sensor modalities. In other words, the emotion vectors 62 determined by the Gaussian mixture model are a combined emotional vector that is determined based on the different sensor modalities available onboard the vehicle 12.

The emotion detection model 42 receives the sensor data 30 captured during a specific time window such as, for example, about sixty seconds. The term x in Equation 1 below represents an observation during the specific time window, and the observation x constitute sensor inputs captured during a specific time window, where each observation x is expressed as $x=\{x_1, x_2, \ldots x_n\}$, and where $x_i$ is a subset of features of x used by classifier output $\lambda_i$=i=1, 2, . . . , C. For each observation x, a class label ω exists belonging to one of the emotional classes K. Equation 1 is expressed as:

$$P(\omega|x) = \sum_{i=1}^{C}\sum_{k=1}^{K} P(\omega|\widetilde{\omega}_k, \lambda_i)P(\widetilde{\omega}_k|\lambda_i, x)P(\lambda_i|x) \quad \text{Equation 1}$$

where P(ω|x) represents the emotion vectors 62, P($\widetilde{\omega}_k|\lambda_i$, x) is the prediction of the classifier output $\lambda_i$, P(ω| $\widetilde{\omega}_k$, $\lambda_i$) is the probability for a given class label ω given that classifier output $\lambda_i$ is assigned a specific label (e.g., $\omega_k$=happy), and P($\lambda_i$|x) is the probability of classifier output $\lambda_i$ for a given observation window x. The emotion vectors 62 are determined by solving for Equation 1, where the emotional vectors 62 represent a specific emotional state of the user 16 as determined based on multiple sensor modalities.

In one example, the classifier output $\lambda_1$ represents the output from the DMS camera, and x: $\omega_1$=[0.05, 0.72, 0.01, 0.22], which indicates the emotional state is highly likely to be happy. The classifier output $\lambda_2$ represents the output from the IR-UWB radar system, and x:$\omega_2$=[0.1, 0.6, 0.08, 0.31]. In the present example, the combined emotional vector of both classifier outputs $\lambda_1$, $\lambda_2$ are expressed as P(ω|x)=[0.06, 0.7, 0.04, 0.2].

In another embodiment, the emotion detection model 42 determines the emotion vector 62 based on the combined Gaussian mixture model and Deep Neural Network (GMM-DNN). In this embodiment, the emotion detection model 42 determines the emotion vector using the Gaussian mixture model described above, which is then supplied to a deep neural network. The deep neural network also receives the sensor data 30 as input and determines the emotion vector 62 based on the input. In embodiments, the deep neural network is a convolutional neural network (CNN).

FIG. 3 is a process flow diagram illustrating a method 100 for determining the content clusters 70 stored in the one or more recording databases 50 is shown in FIG. 2. It is to be appreciated that the one or more recording databases 50 are built as part of an offline process that is separate from the method 200 shown in FIG. 4. Referring to FIGS. 1-3, the method 100 begins at block 102 where the one or more controllers 20 receive the specific recording from the one or more sources of recorded content 8 in combination with one or more user preferences. The user preferences indicate personal preferences of the user 16 and include information such as, but not limited to, favorite songs or musical genres, favorite television shows, favorite movies, recordings that are only played while the user 16 is driving, and recordings that are played when there are multiple occupants in the vehicle 12 (i.e., different songs may be played based on the presence of children). The user preferences may be specified and updated via a mobile application or by the user input device 22 (FIG. 1). The method 100 may then proceed to block 104.

In block 104, the one or more controllers 20 parse the dialogue in the specific recording to determine a text summary of the dialogue. For example, the first verse of the song "Climb" by Miley Cyrus may be parsed into a text summary stating the following: "Doubtful about reaching a dream. Doubts manifest as voice inside my head. Doubts manifest as feeling lost." The text summary may be determined based on extractive methods or, in the alternative, abstractive methods. Some examples of extractive methods include TextRank and latent semantic analysis (LSA). Extractive methods are traditional, while abstractive methods are state-of-the-art and may be based on a recurrent neural network, which is a type of deep neural network. Some examples of abstractive methods include bidirectional encoder representations from transformers (BERT) and generative pretrained transformers (GPT). As mentioned above, the recording may be segmented into different sections, and a text summary may be determined for each section. The method 100 may then proceed to block 106.

In block 106, the controller 20 determines one or more dialogue word vectors that numerically represent the text summary of the dialogue and one or more dialogue emotion vectors that represent emotions expressed in the text summary of the dialogue of the specific recording. The emotion vector may be determined based on machine learning techniques such as GMM and GMM-DNN. The method 100 may then proceed to block 108.

In block 108, the one or more controllers 20 combines the one or more dialogue word vectors that numerically represent the text summary of the dialogue in the specific recording and the one or more dialogue emotion vectors that numerically represent emotions expressed in the text summary of the dialogue together into a combined dialogue word and emotion vector. The combined word and emotion vector may represent either the entire recording or, in the alternative, a section of the recording. The method 100 may then proceed to block 110.

In block 110, the one or more controllers 20 execute a clustering algorithm to determine a centroid of the combined dialogue word and emotion vector representing the represent the text summary of the dialogue in the recording, where the centroid is the content cluster 70 that describes the specific recording. The one or more controllers 20 may then store the content cluster 70 in the one or more recording databases 50. The method 100 may then terminate.

Figure 4:
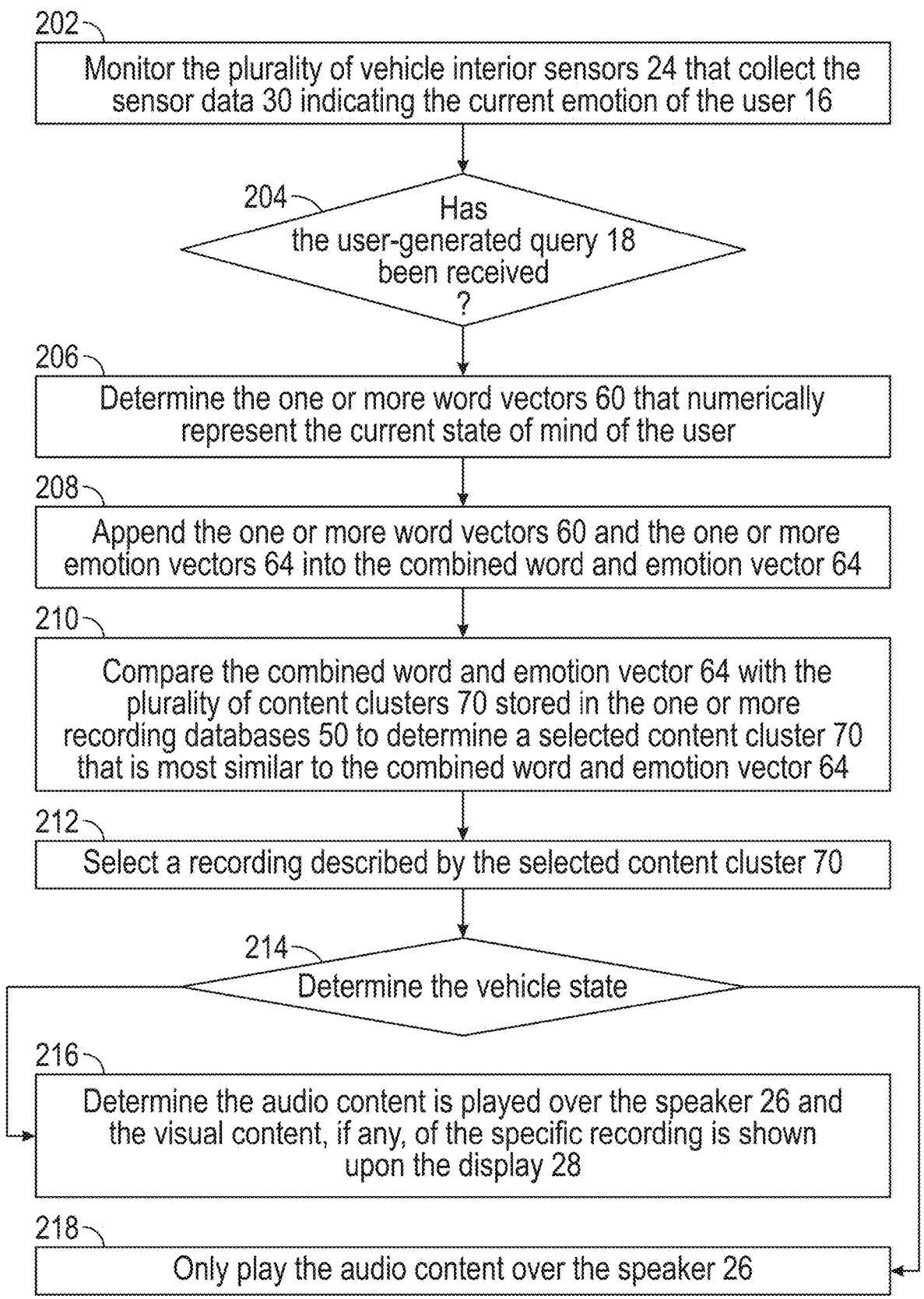
FIG. 4 is a process flow diagram illustrating a method for selecting and playing recordings based on a current emotion of a user by the disclosed infotainment system, according to an exemplary embodiment.

FIG. 4 is a process flow diagram illustrating a method 200 for selecting and playing recordings based on the current emotion of the user 16 by the disclosed infotainment system 10. Referring to FIGS. 1, 2, and 4, the method 200 begins at block 202. In block 202, the controller monitors the plurality of vehicle interior sensors 24 that collect the sensor data 30 indicating the current emotion of the user 16. The method 200 may then proceed to decision block 204.

In decision block 204, the controller 20 continues to monitor the plurality of vehicle interior sensors 24 until receiving the user-generated query 18 including one or more words indicating the current state of mind of the user 16. The method 200 may then proceed to block 206.

In block 206, in response to receiving the user-generated query 18, the word embedding module 40 of the one or more controllers 20 (FIG. 2) determines the one or more word vectors 60 that numerically represent the current state of mind of the user. The emotion detection model 42 of the one or more controllers 20 also determines, based on one or more machine learning techniques, the one or more emotion vectors 62 based on the sensor data 30 collected by the plurality of vehicle interior sensors 24. The method 200 may then proceed to block 208.

In block 208, the combiner module 44 of the one or more controllers 20 appends the one or more word vectors 60 and the one or more emotion vectors 64 into the combined word and emotion vector 64. The method 200 may then proceed to block 210.

In block 210, the similarity module 46 of the one or more controllers 20 compare the combined word and emotion vector 64 with the plurality of content clusters 70 stored in the one or more recording databases 50 to determine a selected content cluster 70 that is most similar to the combined word and emotion vector 64. The method 200 may then proceed to block 212.

In block 212, the selection module 48 of the one or more controllers 20 selects a recording described by the selected content cluster 70, where the recording reflects the current emotion of the user 16. The method 200 may then proceed to decision block 214.

In decision block 214, the selection module 48 determines the vehicle state, where the vehicle state indicates a gear position the vehicle 12 (FIG. 1). Specifically, if the vehicle state is Park, then the method 200 proceeds to block 216, and the selection module 48 determines the audio content is played over the speaker 26 and the visual content, if any, of the specific recording is shown upon the display 28. The method 200 may then terminate. However, in response to determining the vehicle state is a gear position other than Park, then the method 200 proceeds to block 218, the selection module 48 only plays the audio content over the speaker 26. The method 200 may then terminate.

Referring generally to the figures, the disclosed infotainment system provides various technical effects and benefits. Specifically, the infotainment system selects recordings based on the current emotion of the user, thereby providing an intelligent, personalized approach for selecting music and other recordings. In contrast, current systems presently available only allow a user to manually select recordings based on information such as an artist's name, a title of a song, genre, or mood.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. An infotainment system for a vehicle including a plurality of vehicle interior sensors that collect sensor data indicating a current emotion of a user, the infotainment system comprising:
one or more controllers in electronic communication with one or more recording databases that store a plurality of content clusters that each describe a specific recording, the one or more controllers executing instructions to:
monitor the plurality of vehicle interior sensors;
receive a user-generated query including one or more words indicating a current state of mind of the user;
in response to receiving the user-generated query, determine one or more word vectors that numerically represent the current state of mind of the user;
determine, based on one or more machine learning techniques, one or more emotion vectors based on the sensor data collected by the plurality of vehicle interior sensors;
append the one or more word vectors and the one or more emotion vectors into a combined word and emotion vector;
compare the combined word and emotion vector with the plurality of content clusters stored in the one or more recording databases to determine a selected content cluster that is most similar to the combined word and emotion vector; and
select a recording described by the selected content cluster, wherein the recording reflects the current emotion of a user.

2. The infotainment system of claim 1, wherein the one or more machine learning techniques is a Gaussian mixture model (GMM).

3. The infotainment system of claim 2, wherein the emotion vectors determined by the Gaussian mixture model is a combined emotional vector that is determined based on different sensor modalities available onboard the vehicle.

4. The infotainment system of claim 1, wherein the one or more machine learning techniques is a combined Gaussian mixture model and Deep Neural Network (GMM-DNN).

5. The infotainment system of claim 4, wherein the deep neural network is a convolutional neural network (CNN).

6. The infotainment system of claim 1, wherein the recording is segmented into different sections based on emotional content.

7. The infotainment system of claim 1, wherein the recording is one of the following: a musical song, a movie clip, a clip of a television show, a podcast, a training session, educational session, and personal recording.

8. The infotainment system of claim 1, wherein the one or more controllers are in electronic communication with one or more sources of recorded content.

9. The infotainment system of claim 8, wherein the one or more controllers determine the plurality of content clusters that each describe a specific recording by:
receiving the specific recording from the one or more sources of recorded content;
parsing dialogue in the specific recording to determine a text summary of the dialogue; and
determining one or more dialogue word vectors that numerically represent the text summary of the dialogue and one or more dialogue emotion vectors that represent emotions expressed in the text summary of the dialogue of the specific recording.

10. The infotainment system of claim 9, wherein the one or more controllers determine the plurality of content clusters that each describe a specific recording by:
appending the one or more dialogue word vectors that numerically represent the text summary of the dialogue in the specific recording and the one or more dialogue emotion vectors that numerically represent emotions expressed in the text summary of the dialogue together into a combined dialogue word and emotion vector.

11. The infotainment system of claim 10, wherein the one or more controllers determine the plurality of content clusters that each describe a specific recording by:
executing a clustering algorithm to determine a centroid of the combined word and emotion vector representing the represent the text summary of the dialogue in the recording, wherein the centroid is the content cluster that describes the specific recording.

12. The infotainment system of claim 1, wherein the one or more controllers are in electronic communication with a speaker and a display.

13. The infotainment system of claim 12, wherein the one or more controllers execute instructions to:

determine a vehicle state, wherein the vehicle state indicates a gear position the vehicle.

14. The infotainment system of claim 13, wherein the one or more controllers execute instructions to:
in response to determining the vehicle state is Park, determine audio content is played over the speaker and visual content is shown upon the display.

15. The infotainment system of claim 13, wherein the one or more controllers execute instructions to:
in response to determining the vehicle state is a gear position other than Park, only play audio content over the speaker.

16. A method for selecting and playing recordings based on a current emotion of a user by an infotainment system, the method comprising:
monitoring, by one or more controllers, a plurality of vehicle interior sensors, wherein the one or more controllers are in electronic communication with one or more recording databases that store a plurality of content clusters that each describe a specific recording;
receiving a user-generated query including one or more words indicating a current state of mind of the user;
in response to receiving the user-generated query, determining one or more word vectors that numerically represent the current state of mind of the user;
determining, based on one or more machine learning techniques, one or more emotion vectors based on sensor data collected by the plurality of vehicle interior sensors;
appending the one or more word vectors and the one or more emotion vectors into a combined word and emotion vector;
comparing the combined word and emotion vector with the plurality of content clusters stored in the one or more recording databases to determine a selected content cluster that is most similar to the combined word and emotion vector; and
selecting a recording described by the selected content cluster, wherein the recording reflects the current emotion of a user.

17. An infotainment system for a vehicle, comprising:
a plurality of vehicle interior sensors that collect sensor data that indicate a current emotion of a user, wherein the user is located within an interior cabin of the vehicle;
one or more recording databases that store a plurality of content clusters that each describe a specific recording;
one or more controllers in electronic communication with the plurality of vehicle interior sensors and the one or more recording databases, the one or more controllers executing instructions to:
monitor the plurality of vehicle interior sensors;
receive a user-generated query including one or more words indicating a current state of mind of the user;
in response to receiving the user-generated query, determine one or more word vectors that numerically represent the current state of mind of the user;
determine, based on one or more machine learning techniques, one or more emotion vectors based on the sensor data collected by the plurality of vehicle interior sensors;
combine the one or more word vectors and the one or more emotion vectors into a combined word and emotion vector;
compare the combined word and emotion vector with the plurality of content clusters stored in the one or more recording databases to determine a selected content cluster that is most similar to the combined word and emotion vector; and
select a recording described by the selected content cluster, wherein the recording reflects the current emotion of a user.

18. The infotainment system of claim 17, wherein the vehicle interior sensors include one or more of the following: one or more in-cabin cameras that are part of a driver monitoring system (DMS), biometric sensors, pressure sensors, and steering wheel torque sensors.

19. The infotainment system of claim 17, wherein the one or more machine learning techniques is a GMM.

20. The infotainment system of claim 17, wherein the one or more machine learning techniques is a combined GMM-DNN.

* * * * *